(12) United States Patent
Kim et al.

(10) Patent No.: US 12,307,209 B2
(45) Date of Patent: May 20, 2025

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Dongseob Kim, Suwon-si (KR); Dohyoung Mo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 17/739,876

(22) Filed: May 9, 2022

(65) Prior Publication Data

US 2022/0261554 A1     Aug. 18, 2022

Related U.S. Application Data

(63) Continuation of application No. PCT/KR2021/013432, filed on Sep. 30, 2021.

(30) Foreign Application Priority Data

Feb. 17, 2021 (KR) .......................... 10-2021-0021039

(51) Int. Cl.
*G06F 40/35* (2020.01)
*G06F 40/166* (2020.01)
(Continued)

(52) U.S. Cl.
CPC ............ *G06F 40/35* (2020.01); *G06F 40/166* (2020.01); *G06F 40/253* (2020.01); *H04L 51/02* (2013.01)

(58) Field of Classification Search
CPC ...... G06F 40/35; G06F 40/166; G06F 40/253; G06F 40/205; G06F 40/216; G06F 40/268; G06F 40/30; G06F 40/289
See application file for complete search history.

(56) References Cited

U.S. PATENT DOCUMENTS 8,355,904 B2   1/2013   Lee
8,364,485 B2   1/2013   Nasukawa et al.
(Continued)

FOREIGN PATENT DOCUMENTS

JP        8-263092 A     10/1996
JP     2000-276326 A    10/2000
(Continued)

OTHER PUBLICATIONS

"Automatic Correction of Continuous Text Messages," An IP.com Prior Art Database Technical Disclosure, Authors et al.: Disclosed Without Attribution, IP.com No. IPCOM000259373D, IP.com Electronic Publication Date: Aug. 6, 2019 (Year: 2019).*

(Continued)

*Primary Examiner* — Daniel C Washburn
*Assistant Examiner* — Paul J. Mueller
(74) *Attorney, Agent, or Firm* — Sughrue Mion, PLLC

(57) ABSTRACT

Disclosed are an electronic device and a method for controlling an electronic device. The control method may include receiving first text information from an external device; based on second text information previously received from the external device being identified among text information stored in a memory of the electronic device, obtaining third text information by combining the first text information with the second text information; identifying whether the third text information is a completed sentence by performing natural language understanding using the third text information; based on identifying that the third text information is the completed sentence, obtaining at least one response to a user query included in the third text information based on the third text information; and transmitting the at least one response to the external device.

18 Claims, 7 Drawing Sheets

(51) Int. Cl.
*G06F 40/253* (2020.01)
*H04L 51/02* (2022.01)

(56) References Cited

U.S. PATENT DOCUMENTS

| | | | |
|---|---|---|---|
| 10,540,086 | B2 | 1/2020 | Itoh |
| 10,991,366 | B2 | 4/2021 | Kang et al. |
| 2018/0350327 | A1* | 12/2018 | Ciechanowski ....... G09G 5/024 |
| 2018/0357221 | A1 | 12/2018 | Galitsky |
| 2020/0380076 | A1 | 12/2020 | Taylor |
| 2021/0150150 | A1* | 5/2021 | Wu .......................... G06F 40/35 |
| 2022/0215169 | A1* | 7/2022 | Edwards ................. G06N 20/00 |
| 2023/0037749 | A1* | 2/2023 | Kadam .................. G16H 20/70 |

FOREIGN PATENT DOCUMENTS

| | | |
|---|---|---|
| JP | 2017-108344 A | 6/2017 |
| JP | 2019-174918 A | 10/2019 |
| KR | 10-1259558 B1 | 5/2013 |
| KR | 10-2016-0131501 A | 11/2016 |
| KR | 10-2019-0002891 A | 1/2019 |
| KR | 10-2020-0041199 A | 4/2020 |
| KR | 10-2020-0070198 A | 6/2020 |

OTHER PUBLICATIONS

Written Opinion (PCT/ISA/237) issued Jan. 18, 2022 by the International Searching Authority in International Application No. PCT/KR2021/013432.
Search Report (PCT/ISA/210) issued Jan. 18, 2022 by the International Searching Authority in International Application No. PCT/KR2021/013432.
Communication dated Nov. 27, 2023, issued by the European Patent Office in counterpart European Application No. 21870532.5.
European Patent Office Search Report, dated Oct. 13, 2022, issued by the European Patent Office App No. 21870532.5.
Communication dated Jul. 19, 2024, issued by European Patent Office in European Patent Application No. 21870532.5.
Communication dated Jan. 10, 2025, issued by the European Patent Office in European Application No. 21870532.5.
Communication dated Feb. 11, 2025, issued by the European Patent Office in European Application No. 21870532.5.

* cited by examiner

ELECTRONIC DEVICE AND CONTROLLING METHOD OF ELECTRONIC DEVICE

CROSS-REFERENCE TO RELATED APPLICATION(S)

This application is a bypass continuation of International Application No. PCT/KR2021/013432, filed on Sep. 30, 2021, claims benefit of priority to Korean Patent Application No. 10-2021-0021039, filed on Feb. 17, 2021, in the Korean Intellectual Property Office, the disclosure of which is incorporated by reference herein in its entirety.

BACKGROUND

1. Field

This disclosure relates to an electronic device and a method for controlling the electronic device, and more particularly, to an electronic device which may recognize and process separately inputted text information in a completed sentence unit and a method for controlling the electronic device.

2. Description of the Related Art

A service using a "chatbot" which may provide a response to a user query is provided to a user according to development of a field of artificial intelligence (AI).

However, when a user inputs a user query in an atypical manner, the current chatbot may have a limitation of failing to provide an optimal response by clearly recognizing an intention of the user.

In particular, a user who frequently uses social media or a user of a younger age group frequently divides one sentence into several words, phrases, or clauses, instead of inputting the user inquiry in one completed sentence unit while using the chatbot. In this example, the related-art chatbot may generate a response by handling respective words, phrases, or clauses as separate queries, and may result in generating a response that does not match the intention of the user and providing the response to the user.

Therefore, there is a need for chatbot, which is capable of generating a response corresponding to the intention of a user by recognizing and processing one completed sentence unit like a human, even if a user inputs a query by dividing the query into several words, phrases, or clauses, instead of inputting one completed sentence.

The need for a technology for recognizing and processing several separated words, phrases, or clauses in one completed sentence unit is requested not only in the chatbot field but also a messenger-related technology.

SUMMARY

Aspects of the disclosure are to address at least the above-mentioned problems and an aspect of the disclosure is to provide an electronic device which is capable of recognizing and processing text information which is divided into several words, phrases, or clauses in a completed sentence unit and a method for controlling the electronic device.

According to an aspect of an example embodiment, an electronic device may include a communication interface; a memory configured to store text information received from an external device; and a processor configured to: receive first text information from the external device via the communication interface, based on second text information previously received from the external device being identified among the text information stored in the memory, obtain third text information by combining the first text information with the second text information, identify whether the third text information is a completed sentence by performing natural language understanding using the third text information, based on identifying that the third text information is the completed sentence, obtain at least one response to a user query included in the third text information based on the third text information, and control the communication interface to transmit the at least one response to the external device According to an aspect of an example embodiment, a control method of an electronic device may include receiving first text information from an external device; based on second text information previously received from the external device being identified among text information stored in a memory of the electronic device, obtaining third text information by combining the first text information with the second text information; identifying whether the third text information is a completed sentence by performing natural language understanding using the third text information; based on identifying that the third text information is the completed sentence, obtaining at least one response to a user query included in the third text information based on the third text information; and transmitting the at least one response to the external device.

According to an aspect of an example embodiment, a non-transitory computer readable recording medium may include a program to execute a controlling method of an electronic device, wherein the controlling method of the electronic device comprises: receiving first text information from an external device; based on second text information previously received from the external device being identified among text information stored in a memory of the electronic device, obtaining third text information by combining the first text information with the second text information; identifying whether the third text information is a completed sentence by performing natural language understanding using the third text information; based on identifying that the third text information is the completed sentence, obtaining at least one response to a user query included in the third text information based on the third text information; and transmitting the at least one response to the external device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
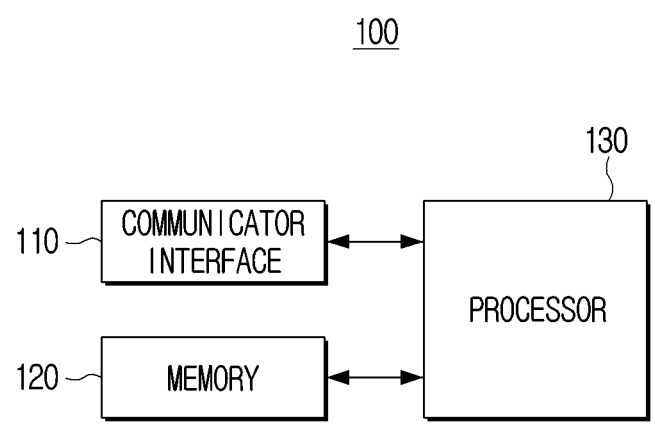
FIG. 1 is a block diagram illustrating a configuration of an electronic device briefly according to an embodiment.

Hereinafter, embodiments of the disclosure will be described with reference to the accompanying drawings. However, it may be understood that the disclosure is not limited to the embodiments described hereinafter, but also includes various modifications, equivalents, and/or alternatives of the embodiments of the disclosure. In relation to explanation of the drawings, similar drawing reference numerals may be used for similar constituent elements.

In the following description, a detailed description of the well-known function or functions may be omitted when it is determined that such description may obscure the gist of the disclosure.

In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified.

In this specification, the expressions "have," "may have," "include," "may include," or the like, represent presence of a corresponding feature (for example: components such as numbers, functions, operations, or parts) and does not exclude the presence of additional features.

In this document, expressions such as "at least one of A [and/or] B," or "one or more of A [and/or] B," include all possible combinations of the listed items. For example, "A or B," "at least one of A and B," or "at least one of A or B" includes any of (1) at least one A, (2) at least one B, or (3) at least one A and at least one B.

As used herein, the terms "first," "second," or the like, may denote various components, regardless of order and/or importance, and may be used to distinguish one component from another, and does not limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

If it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Terms such as "module," "unit," "part," etc., are used to refer to an element that performs at least one function or operation, and such element may be implemented as hardware or software, or a combination of hardware and software. Further, except for when each of a plurality of "modules," "units," "parts," and the like, needs to be realized in an individual hardware, the components may be integrated in at least one module or chip and be realized in at least one processor.

It is understood that various elements and regions in the figures might not necessarily be shown to scale. Accordingly, the scope of the disclosure is not limited by the relative sizes or spacing drawn from the accompanying drawings.

Hereinafter, with reference to the attached drawings, embodiments will be described in detail so that those skilled in the art to which the disclosure belongs to can easily make and use the embodiments.

Figure 2:
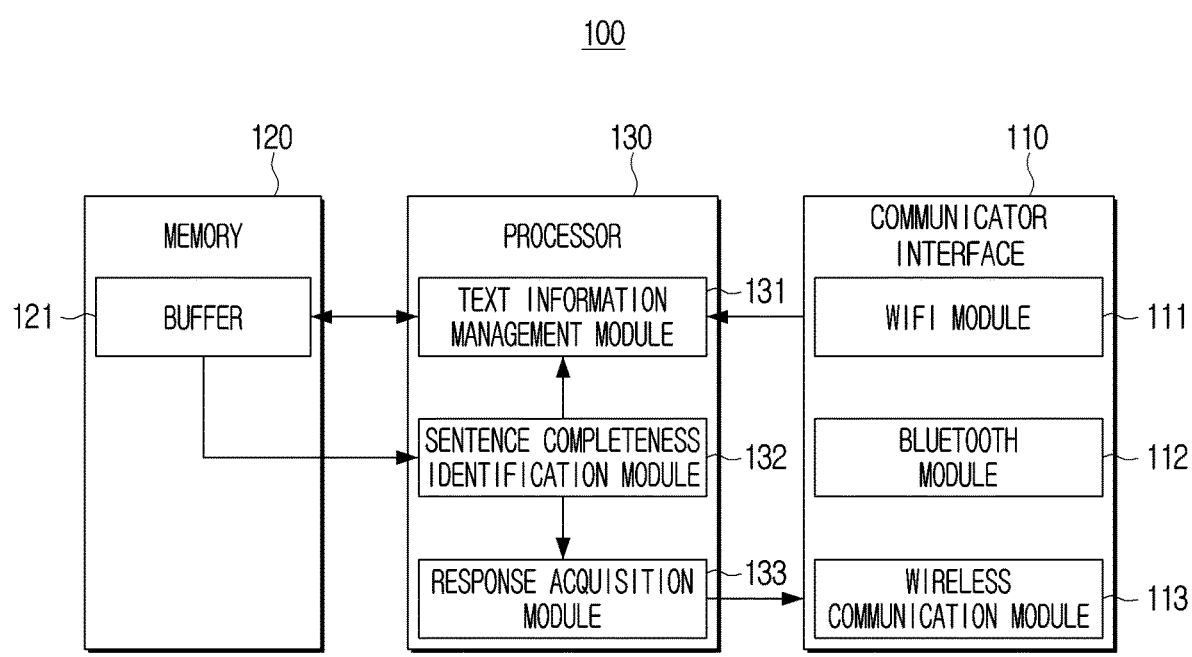
FIG. 2 is a block diagram illustrating a configuration of an electronic device in detail according to an embodiment.

FIG. 1 is a block diagram illustrating a configuration of an electronic device briefly according to an embodiment; and FIG. 2 is a block diagram illustrating a configuration of an electronic device in detail according to an embodiment.

An "electronic device" according to the disclosure refers to a device capable of receiving text information according to an input of a user and providing a service related thereto. The electronic device may provide a chatbot service for providing a response to a user query or a messenger service to provide a chatting environment between a plurality of users. For example, the electronic device may be implemented in a type such as a server, a cloud server, an edge computing device, or the like, but a type of the electronic device is not limited thereto. Hereinafter, the electronic device according to the disclosure is referred to as an "electronic device 100."

An "external device" refers to a device capable of obtaining text information based on input of a user. Specifically, the external device may transmit text information according to a user input to the electronic device 100, and may be provided with a chatbot service or a messenger service provided by the electronic device 100 from the electronic device 100. For example, the external device may be implemented as a user terminal device, such as a smartphone, a tablet personal computer (PC), or the like, but the type of the external device is not limited thereto. Hereinafter, the external device according to the disclosure is referred to as an "external device 200."

As shown in FIG. 1, the electronic device 100 according to an embodiment may include a communication interface 110, a memory 120, and a processor 130. In addition, the communication interface 110, the memory 120, and the processor 130 according to the disclosure may include modules as shown in FIG. 2. However, the configurations as shown in FIGS. 1 and 2 are examples only, and in practicing the disclosure, a new configuration may be added or some configuration may be omitted in addition to the configuration as shown in FIGS. 1 and 2.

The communication interface 110 may include a circuitry and may perform communication with the external device 200. The processor 130 may receive various data or information from the external device 200 connected through the communication interface 110 and may transmit various data or information to the external device 200.

The communication interface 110 may include at least one of a Wi-Fi module 111, a Bluetooth module 112, or a wireless communication module 113. To be specific, the Wi-Fi module 111 may communicate by a Wi-Fi method and the Bluetooth module 112 may communicate by a Bluetooth method. When using the Wi-Fi module 111 or the Bluetooth module 112, various connection information such as a service set identifier (SSID) may be transmitted and received for communication connection and then various information may be transmitted and received. The wireless communication module 113 may communicate according to various communication specifications such as IEEE, Zigbee, $3^{rd}$ generation (3G), $3^{rd}$ generation partnership project (3GPP), long term evolution (LTE), $5^{th}$ generation (5G), or the like. The communication interface 110 may further include a near field communication (NFC) module. The NFC module may communicate by the NFC method using a 13.56 MHz band among various radio frequency identification (RFID) frequency bands such as 135 kHz, 13.56 MHz, 433 MHz, 860-960 MHz, 2.45 GHz, or the like.

According to various embodiments, the processor 130 may receive text information from the external device 200 through the communication interface 110. The processor 130 may control the communication interface 110 to transmit at least one response to the user query included in the text information to the external device 200. The processor 130 may receive additional information related to the text information from the external device 200 through the communication interface 110. An example of additional information will be described later.

The memory 120 may store at least one command for the electronic device 100. In addition, the memory 120 may store an operating system (O/S) for driving the electronic device 100. The memory 120 may store various software programs or applications for operating the electronic device 100 in accordance with various embodiments of the disclosure. The memory 120 may include a semiconductor memory such as a flash memory, a magnetic storage medium such as a hard disk, or the like.

Specifically, the memory 120 may store various software modules for operating the electronic device 100, and the processor 130 may control the operation of the electronic device 100 by executing various software modules that are stored in the memory 120. That is, the memory 120 may be accessed by the processor 130, and may perform reading, recording, modifying, deleting, updating, or the like, of data by the processor 130. It is understood that the term memory 120 may be used to refer to any volatile or non-volatile memory, a read only memory (ROM), random access memory (RAM) proximate to or in the processor 130 or a memory card (for example, a micro secure digital (SD) card, a memory stick, etc.) mounted to the electronic device 100.

The memory 120 according to the disclosure may include a buffer 121. The "buffer 121" refers to one region of the memory 120 for temporarily storing text information received from the external device 200. Additional information related to text information as well as text information received from the external device 200 may be stored in the buffer 121. The "additional information" may include information for identifying the external device 200 that has transmitted text information, information for identifying a user who inputs text information, information related to a reception time of text information, or the like.

Specifically, text information and additional information may be stored in a format of a predefined hashmap. When the electronic device 100 according to the disclosure is implemented as a chatbot server, text information and additional information may be in the form of a hashmap having a "user_id" as a key and a value of "user context," and specifically, "user context" may be in the format of a hashmap having a "text" and "last received time" as a key, respectively, and having values corresponding to respective keys. If the electronic device 100 is implemented as a messenger server, the text information and the additional information may have a "room_id" as a key, "room context" as a value, and each "room context" may be in the format of a hashmap having respective keys of "text" and "last received time" and values corresponding thereto.

Various information in a range of achieving the objective of the disclosure may be stored in the memory 120 and the information stored in the memory 120 may be updated by receiving from the external device 200 or by inputting by the user.

The processor 130 controls the overall operation of the electronic device 100. To be specific, the processor 130 may be connected to the components of the electronic device 100 including the communication interface 110 and the memory 120 and control the overall operation of the electronic device 100 by executing at least one instruction stored in the memory 120 as described above.

The processor 130 may be implemented in various ways. For example, the processor 130 may be implemented with at least one of an application specific integrated circuit (ASIC), an embedded processor, a microprocessor, a hardware control logic, a hardware finite state machine (FSM), and a digital signal processor (DSP). The processor 130 may include a central processing unit (CPU), a graphic processing unit (GPU), a main processing unit (MPU), or the like.

According to various embodiments according to the disclosure, the processor 130 may perform various control processes as described below using a plurality of modules, such as a text information management module 131, a sentence completeness identification module 132, a response acquisition module 133, or the like.

The processor 130 may receive the first text information from the external device 200 through the communication interface 110. The "first text information" refers to arbitrary text information that does not include a completed sentence. The first text information may be text information in a unit of a word, a phrase or a clause. A specific meaning of "the completed sentence" according to the disclosure and a specific method for identifying whether the text information includes the completed sentence will be described later.

The first text information may be input through a physical key or a soft key included in the external device 200, and may be input through a separate input device connected to the external device 200. When a user command for transmitting the first text information to the electronic device 100 is received after the first text information is input to the external device 200, the external device 200 may transmit the first text information to the electronic device 100, and thus the electronic device 100 may receive the first text information through the communication interface 110.

When the second text information pre-received from the external device 200 that has transmitted the first text information is identified from the text information stored in the memory 120, the processor 130 may combine the first text information with the second text information and may obtain third text information. When the third text information is obtained, the processor 130 may update the second text information to the third text information and store the third text information in the buffer 121.

The "second text information" is text information that does not include the completed sentence, and may refer to text information corresponding to the first text information. Specifically, the second text information refers to text information input to the same external device 200 by the same user as the first text information, and may refer to the information which is received from the external device 200 before the first text information, and text information stored in the buffer 121 when the first text information is received.

The "third text information" indicates text information obtained by combining the first text information with the second text information. Specifically, the third text information refers to text information in which the second text information and the first text information are sequentially combined.

The process of identifying the second text information corresponding to the first text information and obtaining the third text information and then storing the third text information in the buffer 121 may be performed through the "text information management module 131." The "text information management module 131" refers to a module for storing/deleting the obtained text information in/from the buffer 121.

The text information management module 131 may identify second text information corresponding to the first text information among the text information stored in the memory 120. According to an embodiment, the text information management module 131 may identify the second text information by identifying text information received from the external device 200, which is the same as the first text information, on the basis of the information for identifying the external device 200 that has transmitted the text information from the additional information stored in the memory 120. According to another embodiment, the text information management module 131 may identify the second text information by identifying the text information input by the same user as the first text information based on information for identifying a user who inputs text information among additional information stored in the memory 120. The text information management module 131 may identify the second text information in consideration of the information for identifying the external device 200 that has transmitted the text information and the information for identifying the user who inputs the text information.

If the second text information is not identified as a result of the identification, the text information management module 131 may store the first text information in the buffer 121 as it is. When the second text information is identified as a result of the identification, the text information management module 131 may combine the second text information with the first text information to obtain third text information in which the second text information and the first text information are sequentially combined. When the third text information is obtained, the text information management module 131 may delete the second text information stored in the buffer 121 and record the third text information in the buffer 121.

The processor 130 may perform natural language understanding for the third text information and may identify whether the third text information includes a completed sentence based on the result of the natural language understanding.

In describing the disclosure, the "completed sentence" may mean having a minimum unit representing the complete content in the sense of semantics, and may not mean that a specific grammatical word class should be included or a sentence should be ended by a formally specific sentence code. A specific criterion for distinguishing the completed sentence and an uncompleted sentence may be determined differently according to various embodiments of the disclosure. The term "completeness" according to the disclosure may be replaced with terms such as "completion" or "termination."

A process of identifying whether the text information includes the completed sentence may be performed through the sentence completeness identification module 132. Hereinafter, various embodiments of identifying whether the third text information includes a completed sentence through the sentence completeness identification module 132 will be described.

Firstly, the sentence completeness identification module 132 may identify whether the third text information includes a completed sentence by using a natural language understanding (NLU) model. The "natural language understanding model" refers to a neural network model trained to perform natural language understanding about inputted text information.

Specifically, the natural language understanding model may perform syntactic analysis and semantic analysis on the third text information and may output a result thereof. More specifically, the natural language understanding model may identify a grammatical element included in the third text information and may identify the meaning of the third text information based on the identified grammatical element.

When the natural language understanding is performed through the natural language understanding model, the sentence completeness identification module 132 may identify whether the third text information includes a completed sentence based on the meaning of the third text information and the grammatical elements included in the third text information. For example, if a grammatical element included in the third text information has an essential component for constructing a sentence, or if the meaning of the third text information indicates the semantically completed content, the sentence completeness identification module 132 may identify that the third text information includes a completed sentence. In addition, whether the third text information includes a sentence-closing ending such as "da (다)", "yo (요)", "lae (레)" and "jwo (줘)", or the like, and whether the third text information includes a sentence sign such as a period, a question mark, or an exclamation mark, or the like, may also be used in a completeness identification process of a sentence included in the third text information.

Secondly, the sentence completeness identification module 132 may identify whether third text information includes a completed sentence based on typing status information received from the external device 200. Here, "typing status information" refers to information indicating that the text information is being input by the user through the external device 200.

Specifically, the external device 200 may detect whether a user inputs a physical key or a soft key for inputting additional text information after the user inputs the first text information, and may transmit the typing status information according to the detection result to the electronic device 100. The processor 130 may then receive the typing status information from the external device 200 via the communication interface 110 and may enter the information to the sentence completeness identification module 132. For example, when the electronic device 100 according to the disclosure is implemented as a server for providing a messenger service, the electronic device 100 may receive typing status information of a user in real time through a web socket, and may broadcast, to all users included in the chatting room, that each user inputs text information through the external device 200.

When the first text information and the typing status information are input, the sentence completeness identification module 132 may identify whether the user inputs additional text information after inputting the first text information through the external device 200 on the basis of the typing status information received within the predetermined threshold period.

Here, the "threshold period" refers to a period from the time when the first text information is received to the time when a predetermined time has elapsed, and the period may be changed by the developer or the user's setting. For example, in identifying whether the third text information includes a completed sentence, the sentence completeness identification module 132 may identify whether the user inputs additional text information after inputting the first text information through the external device 200 using the typing status information received within 3 seconds from the time when the first text information is received among the typing status information which is received in real time.

If the user is identified as inputting additional text information through the external device 200, the sentence completeness identification module 132 may identify that the third text information does not include the completed sentence. If it is identified that the user is not inputting additional text information through the external device 200, the sentence completeness identification module 132 may identify that the third text information includes the completed sentence.

Thirdly, the sentence completeness identification module 132 may identify whether the text information includes a completed sentence based on timer information. The timer information refers to information indicating an elapsed time from the time of receiving the text information, and may be obtained based on the information about receiving the text information among the additional information stored in the memory 120.

Specifically, if the time elapsed from the reception time of the first text information to the current time is greater than or equal to a predetermined threshold value, the sentence completeness identification module 132 may identify that the third text information includes the completed sentence. If the time elapsed from the reception time of the first text information to the current time is less than a predetermined threshold value, the sentence completeness identification module 132 may identify that the third text information does not include the completed sentence.

A process of identifying whether the third text information includes a completed sentence based on the result of the natural language understanding, typing status information, and timing information has been described, but the sentence completeness identification module 132 may identify whether the third text information includes a completed sentence by comprehensively considering the result of the natural language understanding, the typing status information, and timing information. The sentence completeness identification module 132 may identify whether the third text information includes a completed sentence based on at least one of the result of natural language understanding, typing status information or timer information. In fact, it may be desirable to comprehensively consider the result of the natural language understanding, typing status information and timing information as described above in order to increase the accuracy of the sentence completeness identification result according to the disclosure.

According to an embodiment, the sentence completeness identification module 132 may obtain a total score by assigning a weight for each of the first score for the natural language understanding result, the second score for the typing status information, and the third score for the timer information, and may identify that the third text information includes the completed sentence if the obtained total score is greater than or equal to a preset threshold value. The first score, the second score, and the third score may be obtained by quantitatively evaluating the probability that the third text information includes the completed sentence by using the neural network model or the predefined rule based on the natural language understanding result, the typing status information, and the timer information, respectively.

The processor 130 may obtain information on a typing speed for each user and information on a typing habit for each user, generate a database for personalizing a threshold period, a weight, a threshold value, or the like, as described above, and store the database in the memory 120, thereby minimizing the sensitivity of the sentence completeness identification process.

If the third text information includes a completed sentence, the processor 130 may obtain at least one response regarding a user query included in the third text information based on the third text information.

Specifically, the process of obtaining at least one response may be performed via the response acquisition module 133. The "response acquisition module 133" may identify at least one response to a user query included in the text information and obtain information about at least one response.

The response acquisition module 133 may obtain at least one response to the user query using a natural language generation (NLG) model, which is a neural network model trained to obtain at least one response to the user query. In addition, the response acquisition module 133 may obtain at least one response to the user query by identifying at least one response that matches the user query among the plurality of responses based on the pre-established database and a predefined rule.

If the third text information includes the completed sentence, the processor 130 may remove the third text information from the buffer 121 after the at least one response is transmitted to the external device 200. If the third text information does not include the completed sentence, the processor 130 may additionally maintain the third text information in the buffer 121 until fourth text information is additionally received from the external device 200 or a predetermined time elapses.

In other words, if the text information stored in the buffer 121 includes the completed sentence, the processor 130 may provide a response to the user query included in the text information and then may initialize the buffer 121 to store/manage the text information to be received. If the text information stored in the buffer 121 does not include the completed sentence, the processor 130 may not provide a response to the user query and wait until additional text information is received, and if additional text information is not received even when a preset time is reached, the processor 130 may identify that a dialog session is terminated and may initialize the buffer 121. Here, initializing the buffer 121 when a predetermined time elapses is to prevent unnecessary text information from being accumulated in the buffer 121. The predetermined time may be, for example, 1 hour or one day, and may be set to various times depending on the implementation example.

When at least one response to the user query is obtained, the processor 130 may control the communication interface 110 to transmit the obtained at least one response to the external device 200. The at least one response may be transmitted to the external device 200 in the form of text information, and may be transmitted to the external device 200 in the form of a voice signal. When at least one response is transmitted to the external device 200, the external device 200 may display text information corresponding to at least one response through the display 151 of the external device 200, and may output a voice signal corresponding to at least one response through a speaker 152 of the external device 200. Even when at least one response is transmitted to the external device 200 in the form of text information, the external device 200 may convert the text information into a voice signal and may output the voice signal.

It has been described that, when the third text information includes the completed sentence, at least one response to the user query is obtained, and the at least one response is transmitted to the external device 200, but according to another embodiment, the processor 130 may control the communication interface 110 to transmit the third text information itself to the external device 200 when the third text information includes the completed sentence. An embodiment of transmitting the third text information itself to the external device 200 will be described with reference to FIGS. 4 and 5.

According to the embodiment described above with reference to FIGS. 1 and 2, the electronic device 100 may provide an optimal response corresponding to the intention of a user by providing a response to a user query included in the completed sentence after recognizing a completed sentence by combining a plurality of words, phrases, clauses, or the like, even when a user inputs one sentence by dividing the sentence into several words, phrases, clauses, or the like, through the external device 200 such as a user terminal.

When the electronic device 100 according to the disclosure is implemented as a server for providing a chatbot service, a dialogue understanding range of the chatbot may be extended to provide a natural response, thereby improving user satisfaction. The electronic device 100 according to the disclosure may wait until the sentence is completed and then process the completed sentence without processing each of the separated text information, thereby significantly improving the efficiency of the chatbot engine.

Figure 3:
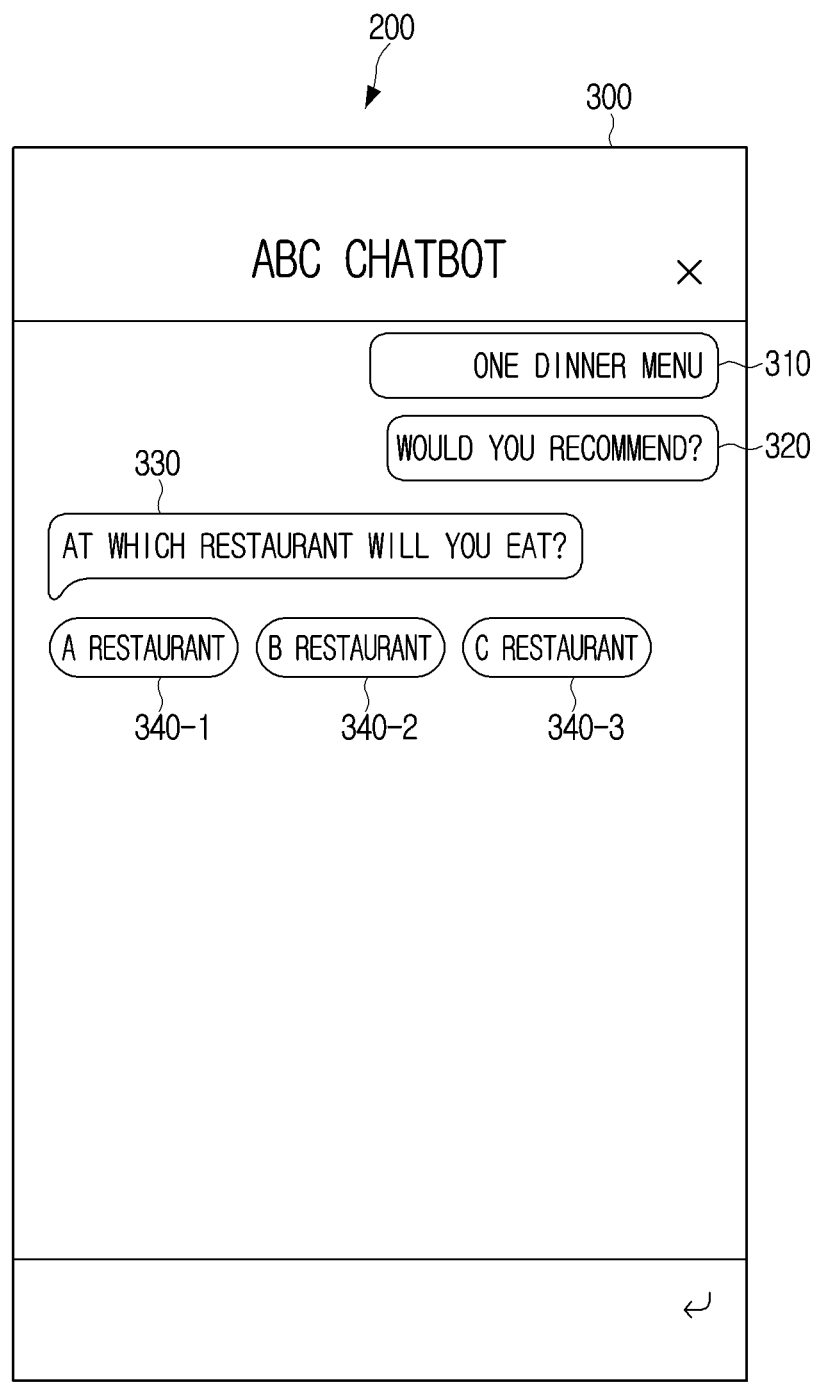
FIG. 3 is a diagram illustrating an example of a user interface provided by an external device according to an embodiment.

FIG. 3 is a diagram illustrating an example of a user interface provided by an external device according to an embodiment.

The user interface illustrated in FIG. 3 indicates a user interface provided through the external device 200. For example, if the "ABC chatbot," which is a chatbot application stored in the external device 200, is executed, a user interface, such as FIG. 3, may be provided, and the user may enter input text information through the user interface. Hereinafter, an embodiment according to the disclosure will be described with reference to the case where text information such as the example of FIG. 3 is input. The terms such as the first text information, the second text information, and the third text information used in the description of FIG. 3 are used in the same meaning as defined in FIGS. 1 and 2.

As shown in FIG. 3, when the first text information "one dinner menu 310" is input by the user, the external device 200 may display a user interface including the first text information "one dinner menu" 310 on a display 151 of the external device 200.

The external device 200 may transmit first text information to the electronic device 100, and the electronic device 100 may receive the first text information from the external device 200 and store the first text information in the buffer 121 included in the memory 120 of the electronic device 100. If the other text information input to the same external device 200 by the same user as the first text information is not in a state of being stored in the buffer 121, only the first text information in which other text information is not combined may be stored in the buffer 121.

The electronic device 100 may then identify that the first text information "one dinner menu" 310 does not include the completed sentence. That the first text information does not include a completed sentence may be determined, based on performing a natural language understanding, that the first text information "one dinner menu" 310 does not include one semantically complete content, that all the essential components for constructing the sentence are not included, and that a sentence-closing ending is not included, or the like.

It is identified that the first text information does not include a completed sentence and thus, the electronic device 100 may not obtain and provide a response to the first text information and may wait until additional text information is received from the external device 200 or a predetermined time elapses.

As shown in FIG. 3, when the second text information "would you recommend?" 320 is input by the user, the external device 200 may display the user interface including the second text information "would you recommend?" 320 on the display 151 of the external device 200.

The external device 200 may transmit first text information to the electronic device 100, and the electronic device 100 may receive the first text information from the external device 200 and store the first text information in the buffer 121 included in the memory 120 of the electronic device 100. Since the first text information input to the same external device 200 is stored in the buffer 121 by the same user as the second text information, the electronic device 100 may store the second text information in the buffer 121 so that the second text information is sequentially coupled to the first text information. After the second text information is received, the buffer 121 may store third text information, such as a "would you recommend one dinner menu?".

The electronic device 100 may identify that the third text information "would you recommend one dinner menu?" includes a completed sentence. That the third text information includes a completed sentence may be determined based on that, as a result of performing a natural language understanding, the third text information "would you recommend one dinner menu?" includes one semantically completed content, that all of the essential components for constructing a sentence are included, and that a sentence-closing ending for an interrogative sentence and a sentence symbol is included, or the like.

That the third text information includes the completed sentence is identified and thus, the electronic device 100 may obtain at least one response to the user query included in the third text information and transmit the obtained at least one response to the external device 200. As shown in FIG. 3, the electronic device 100 may obtain a response, such as "at which restaurant will you eat?" 330 and transmit the response to the external device 200, and the external device 200 may display the obtained response in the user interface.

As shown in FIG. 3, the electronic device 100 may transmit information about "A restaurant" 340-1, "B restaurant" 340-2 and "C restaurant" 340-3 to the external device 200 together with the response "at which restaurant will you eat?" 330, and the external device 200 may display a UI element indicating the "A restaurant" 340-1, "B restaurant" 340-2, and "C restaurant" 340-3 in the user interface. The external device 200 may display detailed information corresponding to the UI element selected by the user through the user interface when a user command for selecting one of the UI elements "A restaurant" 340-1, "B restaurant" 340-2, and "C restaurant" 340-3 is received by the user. The detailed information corresponding to the UI element selected by the user may be obtained directly by the external device 200 or may be obtained through the electronic device 100 or another external device 200.

Figure 4:
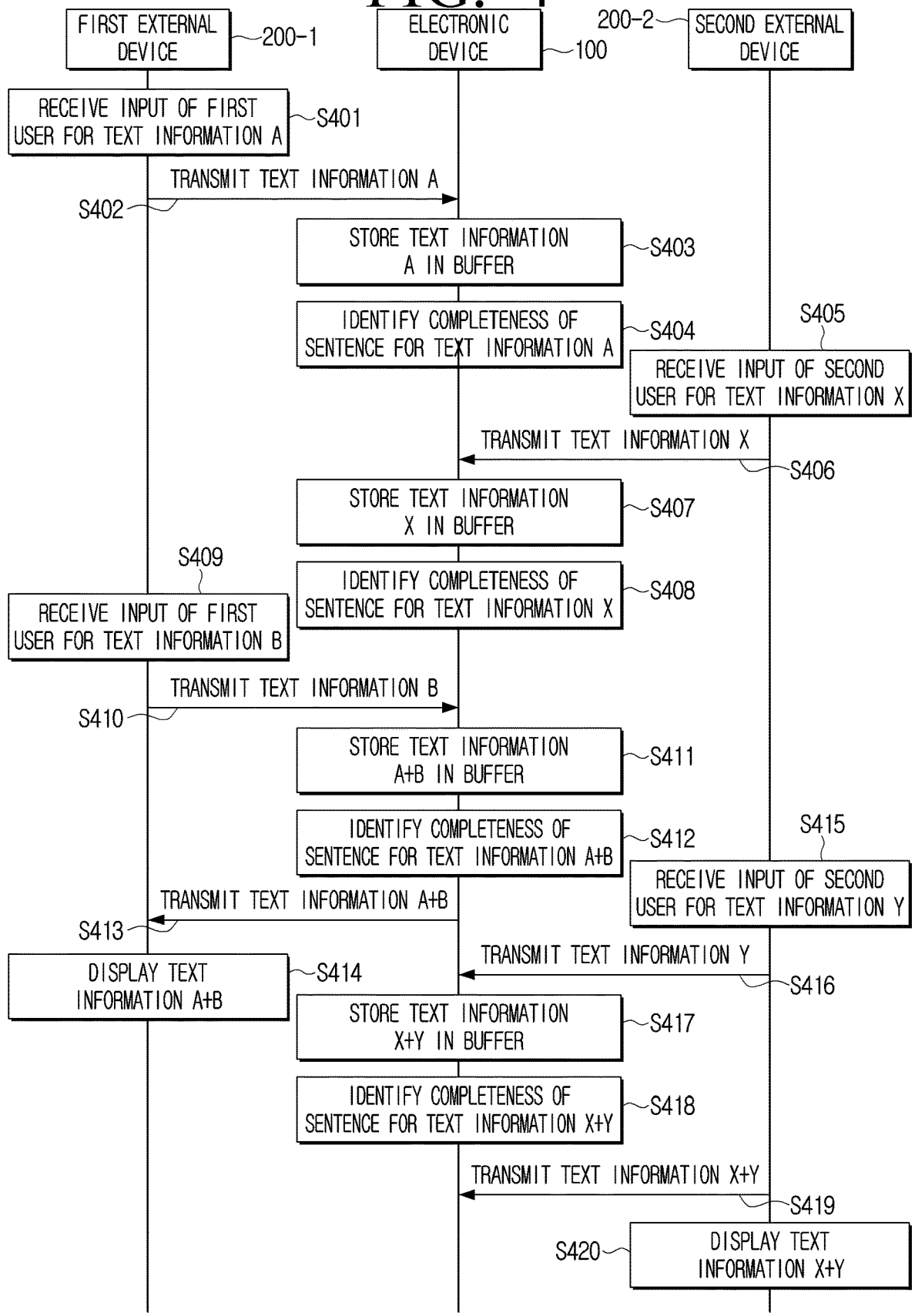
FIG. 4 is a sequence diagram illustrating an operation of an electronic device and external devices according to an embodiment.
Figure 5:
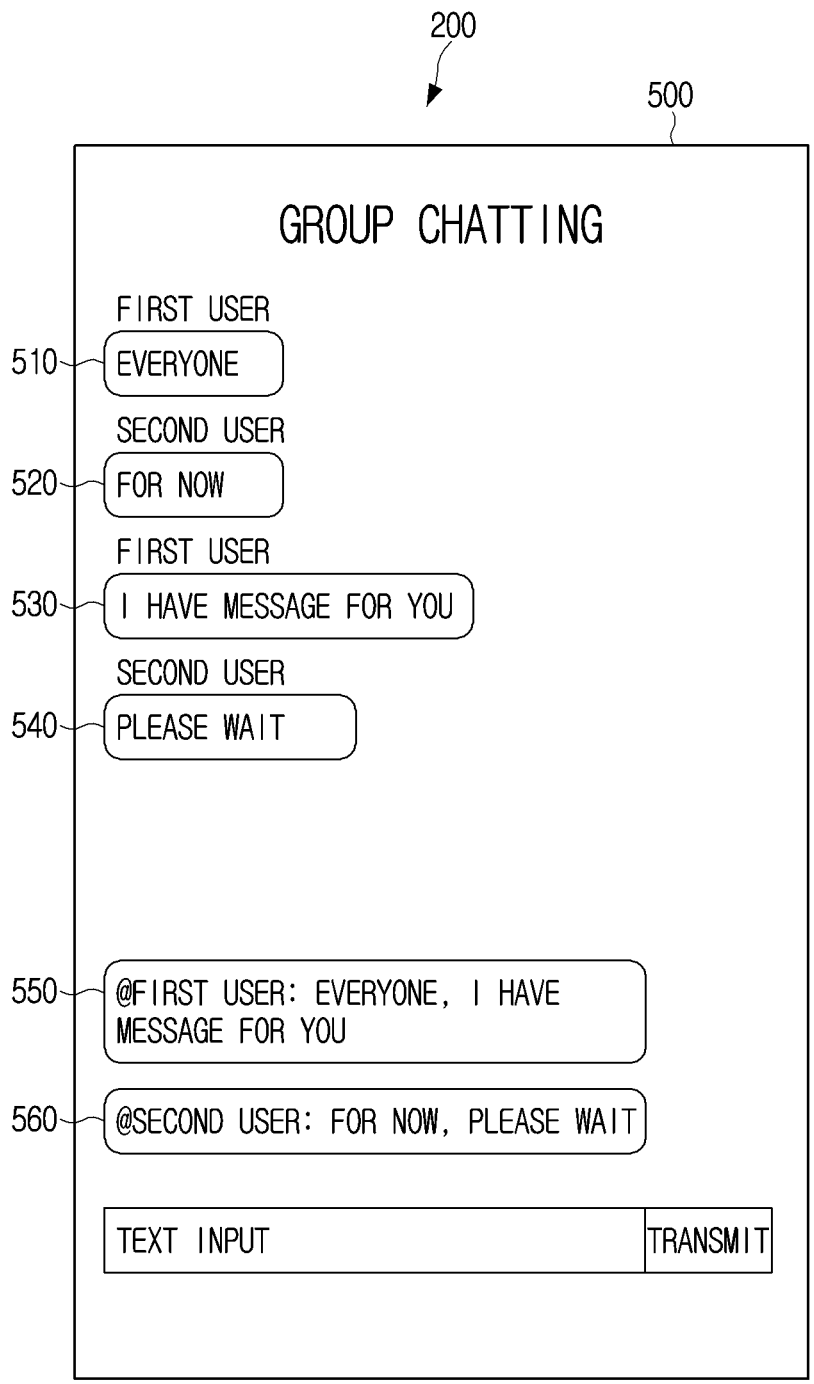
FIG. 5 is a diagram illustrating an example of user interface provided by an external device according to an embodiment.

FIG. 4 is a sequence diagram illustrating an operation of an electronic device and external devices according to an embodiment. FIG. 5 is a diagram illustrating an example of user interface provided by an external device according to an embodiment. Hereinafter, the embodiment will be described with reference to FIGS. 4 and 5 together.

Although various embodiments of the disclosure are implemented through the electronic device 100 and one external device 200 in the description of FIGS. 1-3, the embodiment is not limited thereto. As shown in FIG. 4, embodiments according to the disclosure may be implemented through the electronic device 100 and two or more external devices 200.

When an embodiment according to the disclosure is implemented through the electronic device 100 and the two or more external devices 200, the electronic device 100 may receive text information from each of the first external device 200-1 and the second external device 200-2 and may store the text information in the buffer 121. The buffer 121 may include a first buffer 121 for storing/managing text information received from the first external device 200-1 and a second buffer 121 for storing/managing text information received from the second external device 200-2.

In contrast to the example where the electronic device 100 according to the disclosure is implemented as a server for providing a chatbot service, when the electronic device 100 is implemented as a server for providing a messenger service, it is not necessary to provide a response to the text information. Accordingly, the electronic device 100 may not obtain at least one response corresponding to the text information when the text information includes the completed sentence. In this case, the electronic device 100 may transmit the text information itself including the completed sentence to the external device 200, and the specific embodiment will be described with reference to FIGS. 4 and 5.

Referring to FIG. 4, the first external device 200-1 may receive the input of the first user for the text information A in operation S401. The text information A may be input through a physical key or a soft key included in the first external device 200-1, or may be input through a separate input device connected to the first external device 200-1. For example, as shown in FIG. 5, the first user may input text information A "everyone" 510 into the first external device 200-1.

The first external device 200-1 may transmit the text information A to the electronic device 100 in operation S402. The first external device 200-1 may transmit the text information A to the electronic device 100 based on receiving a user command to transmit the text information A to the electronic device 100 after the text information A is input.

When text information A is received from the external device 200, the electronic device 100 may store the text information A in the buffer 121 in operation S403. The electronic device 100 may identify whether text information input by the first user and received from the first external device 200-1, that is, text information corresponding to the text information A, is stored in the buffer 121 included in the memory 120 of the electronic device 100. If the text information corresponding to the text information A is not stored in the buffer 121, the electronic device 100 may store the text information A, which is not combined with other text information, in the buffer 121.

When the text information A is stored in the buffer 121, the electronic device 100 may identify the completeness of the sentence for the text information A in operation S404. A detailed embodiment for identifying the completeness of a sentence, that is, whether the text information A includes the completed sentence has been described with reference to FIG. 1 and FIG. 2, and the duplicate description will be omitted.

As illustrated in the example of FIG. 5, if the text information A "everyone" 510 does not include the completed sentence, the electronic device 100 may wait until additional text information is received from the first external device 200-1 or a predetermined time elapses. The text information A stored in the buffer 121 may be maintained until additional text information is received from the first external device 200-1 or a predetermined time elapses.

The second external device 200-2 may receive the input of the second user for the text information X in operation S405, and may transmit the text information X to the electronic device 100 in operation S406. When the text information X is received, the electronic device 100 may store the text information X in the buffer 121 in operation S407, and may identify the completeness of the sentence for the text information Y in operation S408.

As illustrated in the example of FIG. 5, if the text information X "for now" 520 does not include the completed sentence, the electronic device 100 may wait until additional text information is received from the second external device 200-2 or a predetermined time elapses. The text information X stored in the buffer 121 may be maintained until additional text information is received from the second external device 200-2 or a predetermined time elapses.

The first external device 200-1 may receive the input of the first user for the text information B in operation S409, and transmit the text information B to the electronic device 100 in operation S410. When the text information B is received from the external device 200, the electronic device 100 may store the text information A+B in the buffer 121 in operation S411. As illustrated in FIG. 5, text information B is text information may be text information "I have a message for you" 530, and text information A+B may be text information "hi, everyone, I have a message for you."

The electronic device 100 may identify whether text information received from the first external device 200-1, that is, text information corresponding to the text information B, is stored in the buffer 121 included in the memory 120 of the electronic device 100. As illustrated in FIGS. 4 and 5, when the text information A corresponding to the text information B is stored in the buffer 121, the electronic device 100 may store the text information A+B in which the text information B is sequentially coupled to the text information A in the buffer 121.

If the text information A+B is stored in the buffer 121, the electronic device 100 may identify the completeness of the sentence for the text information A+B in operation S412. As illustrated in FIG. 5, when the text information A+B includes as completed sentence such as, "everyone, I have a message for you", the electronic device 100 may transmit the text information A+B to the first external device 200-1 in operation S413. Although not shown in FIG. 4, the electronic device 100 may transmit the text information A+B to the second external device 200-2. The electronic device 100 may remove the text information A+B from the buffer 121 after the text information A+B is transmitted to the first external device 200-1 and the second external device 200-2.

If the text information A+B is received, the first external device 200-1 may display the text information A+B in operation S414. Specifically, the first external device 200-1 may display, on the display 151 of the first external device 200-1, a user interface including the text information A+B, "@ first user: everyone, I have a message for you" 550. As described above, the text information A+B is also transmitted to the second external device 200-2, and the second external device 200-2 may also display a user interface including text information A+B on the display 151 of the second external device 200-2.

The second external device 200-2 may receive the input of the second user for the text information Y in operation S415, and transmit the text information Y to the electronic device 100 in operation S416. When the text information Y is received, the electronic device 100 may store the text information X+Y in the buffer 121 in operation S417. As illustrated in the example of FIG. 5, the text information Y may be the text information "please wait" 540, and the text information X+Y may be text information "for now, please wait."

If text information X+Y is stored, the electronic device 100 may identify the completeness of the sentence for the text information X+Y in operation S418. As illustrated in FIG. 5, when the text information X+Y, "for now, please wait" includes a completed sentence, the electronic device 100 may transmit the text information X+Y to the second external device 200-2 in operation S419. Although not shown in FIG. 4, the electronic device 100 may transmit the text information X+Y to the first external device 200-1 as well. After the text information X+Y is transmitted to the first external device 200-1 and the second external device 200-2, the electronic device 100 may remove the text information X+Y from the buffer 121. When the text information X+Y is received, the second external device 200-2 may display the text information X+Y in operation S420. The second external device 200-2 may display a user interface including the text information X+Y "@ second user: for now, please wait" 560 on the display 151 of the second external device 200-2.

According to the embodiment described above with reference to FIGS. 4 and 5, when a user inputs one sentence divided into several words, phrases, or clauses, the electronic device 100 may combine a plurality of words, phrases, or clauses, to recognize the completed sentence and remind the user of the text information including the completed sentence, thereby significantly improving user convenience.

In particular, when the electronic device 100 according to the disclosure is implemented as a server for providing a messenger service, even though a plurality of users participating in the chat room simultaneously input several words, phrases, clauses, or the like, the text information input by each user may be displayed in a sentence unit again through a user interface, thereby preventing confusion of users and improving user's satisfaction to the user interface.

Figure 6:
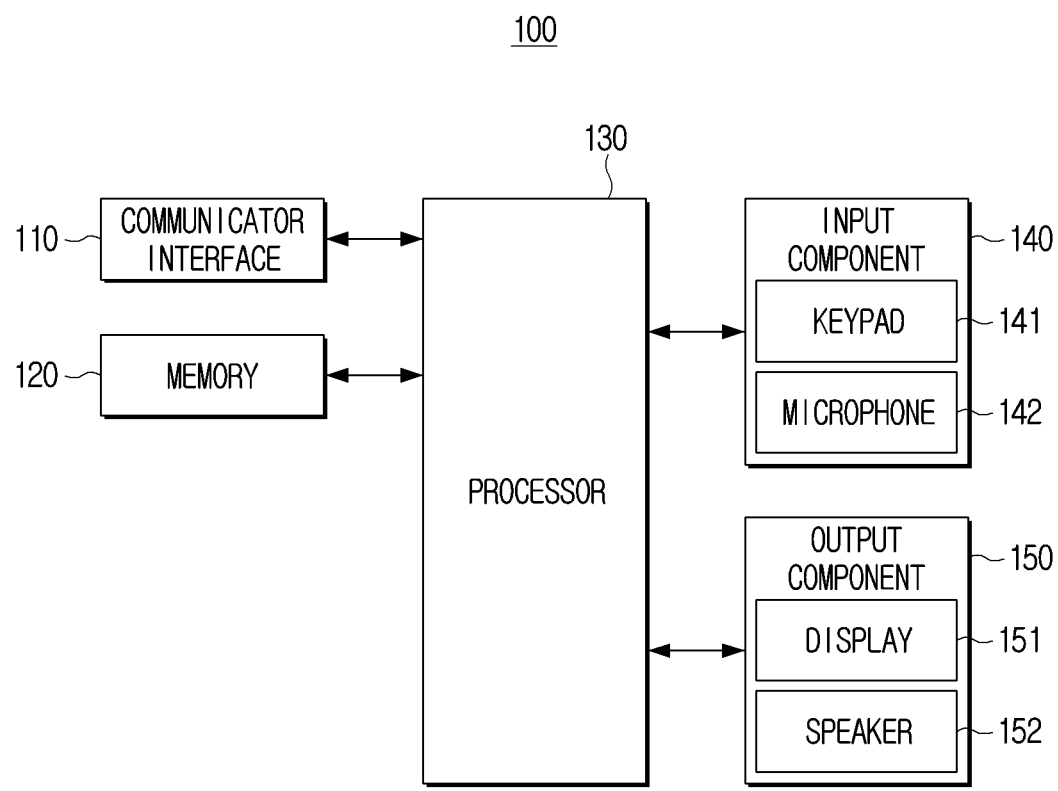
FIG. 6 is a block diagram illustrating a configuration of an electronic device according to an embodiment.

FIG. 6 is a block diagram illustrating a configuration of an electronic device according to an embodiment.

In the description of FIGS. 1 to 5, it has an assumption that a device for identifying completeness of a sentence for text information and a device for receiving text information from the user are implemented as separate devices such as the electronic device 100 and the external device 200, but the operation of the electronic device 100 and the external device 200 according to one embodiment of the disclosure may be performed through a single device. For example, the electronic device 100 according to the disclosure may include a plurality of modules for receiving a user input and outputting information to be provided to the user and also for providing a chatbot service in an on-device manner.

When the plurality of modules are implemented in an on-device mode in one electronic device 100, the electronic device 100 may further include the communication interface 110, the memory 120, the processor 130, as well as an input component 140 and an output component 150. Because the communication interface 110, the memory 120, and the processor 130 are described above with reference to FIGS. 1 and 2, a redundant description will be omitted, and the input component 140 and the output component 150 will now be described.

The input component 140 includes a circuitry, and the processor 130 may receive a user command for controlling the operation of the electronic device 100 through the input component 140. Specifically, the input component 140 may include a keypad 141, a microphone 142, a camera, and a remote controller signal receiving unit. The input component 140 may be implemented in a form included in the display 151 as a touch screen. The keypad 141 may include a physical key or a soft key. The microphone 142 may receive a voice signal and convert the received voice signal to an electrical signal.

According to various embodiments according to the disclosure, the processor 130 may receive text information through the keypad 141, receive the voice signal from the microphone 142, and obtain text information on the basis of the voice signal. The process of obtaining text information based on a voice signal may be performed through an automatic speech recognition (ASR) model referred to as a so-called speech recognition model.

The output component 150 includes a circuitry, and the processor 130 may output various functions which the electronic device 100 may perform through the output component 150. The output component 150 may include at least one of a display 151, a speaker 152, and an indicator.

The display 151 may output image data under the control of the processor 130. The display 151 may output a pre-stored image to the memory 120 under the control of the processor 130. In particular, the display 151 according to an embodiment may display a user interface (UI) stored in the memory 120. The display 151 may be implemented as a liquid crystal display (LCD) panel, an organic light emitting diode (OLED) display, or the like, and the display 151 may be implemented as a flexible display, a transparent display, or the like. However, the display 151 according to the disclosure is not limited to a specific type. The speaker 152 may output audio data under the control of the processor 130, and the indicator may be turned on by the control of the processor 130.

According to various embodiments, when at least one response to a user query included in text information is obtained, the processor 130 may control the display 151 to display text information corresponding to at least one response. The processor 130 may control the display 151 to display a user interface (UI) including text information corresponding to at least one response, and may further receive a user input for at least one response through the UI displayed on the display 151.

The processor 130 may obtain a voice signal based on text information corresponding to the at least one response, and may output a voice signal corresponding to the at least one response through the speaker 152. The process of obtaining a speech signal corresponding to at least one response based on text information may be performed through a neural network model referred to as a so-called text-to-speech (TTS) model.

Figure 7:
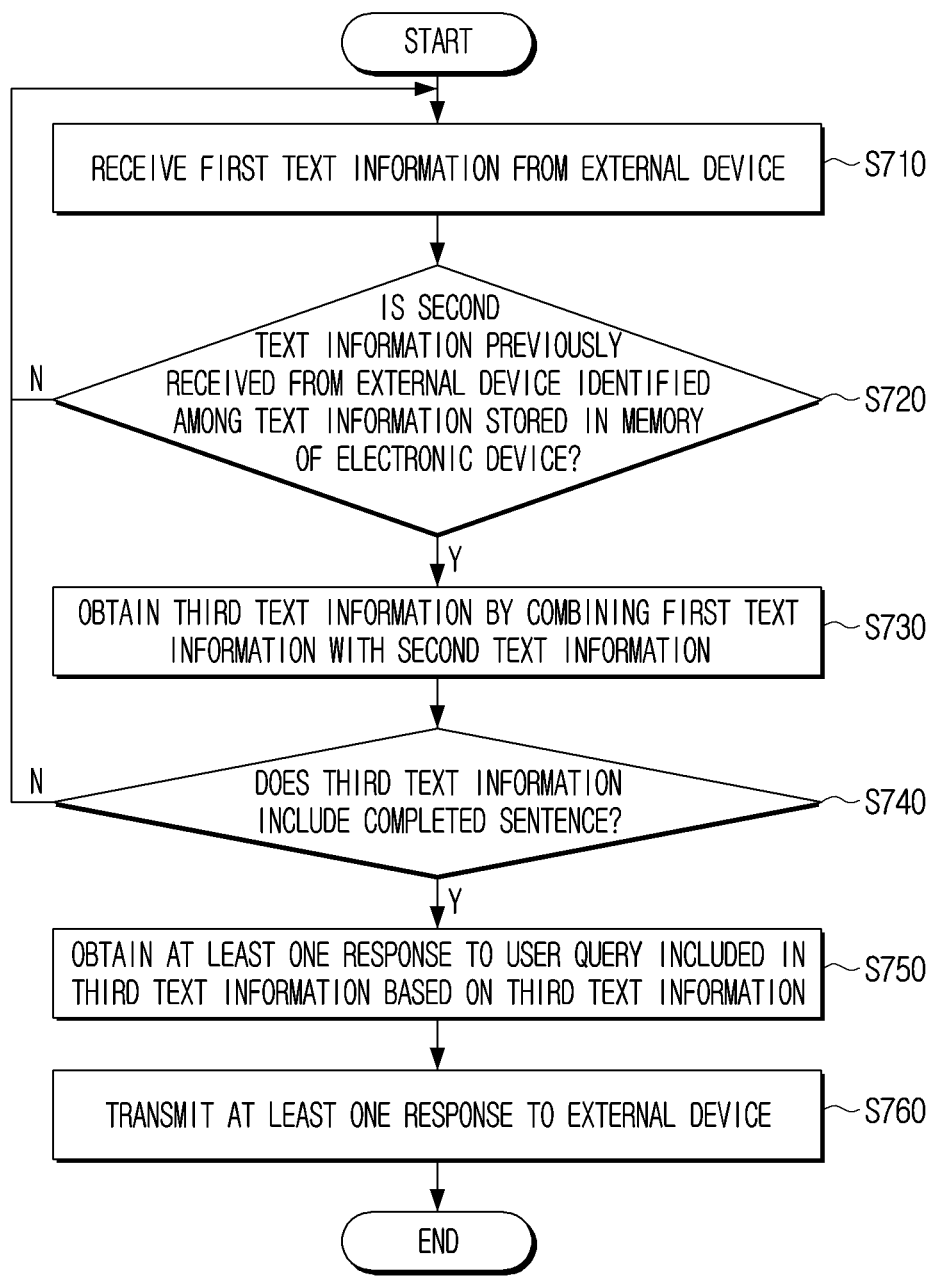
FIG. 7 is a flowchart illustrating a method for controlling an electronic device according to an embodiment.

FIG. 7 is a flowchart illustrating a method for controlling an electronic device according to an embodiment.

The electronic device 100 according to an embodiment may receive first text information from the external device 200 in operation S710, and may identify second text information previously received from the external device 200 among the text information stored in the memory 120 of the electronic device 100 in operation S720. The text information may be stored in the buffer 121, which is an area of the memory 120 for temporarily storing text information received from the external device 200.

If the second text information is identified in operation S720-Y, the electronic device 100 may sequentially connect (combine) the first text information with the second text information to obtain third text information in operation S730, and may update the second text information to the third text information to store the third text information in the buffer 121. If the second text information is not identified in operation S720-N, the electronic device 100 may wait until additional text information is received from the external device 200 or wait until a predetermined time has elapsed, and maintain second text information stored in the buffer 121.

The electronic device 100 may identify whether the third text information includes a completed sentence in operation S740. The electronic device 100 may identify whether the third text information includes a completed sentence based on at least one of result of natural language understanding, typing status information, or timer information. Here, "typing status information" refers to information indicating whether a user is inputting text information through the external device 200. The "timing information" refers to information indicating an elapsed time from the reception time of the text information, and may be obtained based on the information about the reception time of the text information among pre-stored additional information. Since the process of identifying the completeness of the sentence included in the other text information has been described above with respect to FIGS. 1 and 2, a redundant description of the same contents will be omitted.

If the third text information does not include the completed sentence in operation S740-N, the electronic device 100 may maintain third text information stored in the buffer 121 while waiting until receive additional text information from the external device 200 or a predetermined time has elapsed.

If the third text information includes the completed sentence in operation S740-Y, at least one response to the user query included in the third text information may be obtained based on the third text information in operation S750. Specifically, the electronic device 100 may obtain at least one response to a user query using a natural language generation model that is a neural network model trained to obtain at least one response to a user query. The electronic device 100 may obtain at least one response to the user query by identifying at least one response that matches the user query among the plurality of responses based on the pre-established database and predefined rules.

If at least one response is obtained, the electronic device 100 may transmit at least one response to the external device 200 in operation S760. The at least one response may be transmitted to the external device 200 in the form of text information, but may be transmitted to the external device 200 in the form of a voice signal. When at least one response is transmitted to the external device 200, the external device 200 may display text information corresponding to at least one response through the display 151 of the external device 200, and may output a voice signal corresponding to at least one response through the speaker 152 of the external device 200.

The controlling method of the electronic device 100 according to an embodiment as described above may be implemented as a program and provided to the electronic device 100. A program including the controlling method of the electronic device 100 may be stored in a non-transitory computer readable medium and provided.

A non-transitory computer readable recording medium may comprise a program to execute a controlling method of the electronic device 100, wherein the controlling method of the electronic device 100 includes receiving first text information from the external device 200; based on second text information previously received from the external device 200 being identified among text information stored in the memory 120 of the electronic device 100, obtaining third text information by combining the first text information with the second text information, identifying whether the third text information comprises a completed sentence by performing natural language understanding for the third text information, based on the third text information comprising a completed sentence; obtaining at least one response to a user query included in the third text information based on the third text information; and transmitting the at least one obtained response to the external device 200.

The controlling method of the electronic device 100 and a computer-readable recording medium including a program to execute the controlling method of the electronic device 100 have been described in brief, but this is to omit redundant description, and various embodiments of the electronic device 100 may be applied to a computer-readable recording medium including the controlling method of the electronic device 100, and a program for executing the controlling method of the electronic device 100.

According to various embodiments as described above, the electronic device 100 may provide an optimal response corresponding to the intention of a user by providing a response to a user query included in the completed sentence after recognizing the completed sentence by combining a plurality of words, phrases, clauses, or the like, even when a user inputs one sentence by diving the sentence into several words, phrases, clauses, or the like, through the external device 200 such as a user terminal.

When the electronic device 100 is implemented as a server for providing a chatbot service, a dialogue understanding range of the chatbot may be extended to provide a natural response, thereby improving user satisfaction. The electronic device 100 according to the disclosure may significantly improve efficiency of the chatbot engine by processing a completed sentence after waiting until a sentence is completed, instead of processing each of divided text information.

When a user inputs one sentence by dividing one sentence into several words, phrases, clauses, etc., the electronic device 100 may combine several words, phrases, or clauses to recognize the completed sentence and remind the user of the text information including the completed sentence, thereby significantly improving user convenience.

In particular, when the electronic device 100 is implemented as a server for providing a messenger service, even though a number of users participating in the chat room input several words, phrases, clauses, or the like, alternately, the text information input by each user is displayed in a sentence unit again through the user interface, so that dialogue content between the users may be conveniently understood.

In addition, when the dialogue content is stored for the purpose of analyzing the dialogue pattern, when the dialogue content is stored in the form of a completed sentence that is not individual text information, it is easy to grasp the dialogue flow or the causal relationship of dialogues when analyzing the dialogue pattern, and thus a high usability may be provided.

When storing dialogues for the purpose of learning of machine learning models, storing the dialogue contents in a completed sentence rather than individual text information makes it easy to learn the relationship between words in a sentence and thus the utilization as a corpus is higher.

The function related to the natural language understanding model, the natural language generation model, etc., as described above, may be performed through the memory 120 and the processor 130.

The processor 130 may include one or a plurality of processors 130. At this time, one or a plurality of processors 130 may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors 130 control the processing of the input data in accordance with a predefined operating rule or artificial intelligence (AI) model stored in the non-volatile memory 120 and the volatile memory 120. The predefined operating rule or artificial intelligence model is provided through training or learning.

Being provided through learning may refer, for example, to, by applying a learning algorithm to a plurality of learning data, a predefined operating rule or AI model of a desired characteristic being made. The learning may be performed in a device itself in which AI according to an embodiment is performed, and/o may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may include a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

The storage medium readable by a machine may be provided in the form of a non-transitory storage medium. The "non-transitory storage medium" is a tangible device and may not include a signal (e.g., electromagnetic wave). This term does not distinguish that data is permanently or temporarily stored in the storage medium. For example, "non-transitory storage medium" may include the buffer 120 storing data temporarily.

According to various embodiments, a method disclosed herein may be provided in a computer program product. A computer program product may be traded between a seller and a purchaser as a commodity. A computer program product may be distributed in the form of a machine readable storage medium (e.g., compact disc ROM (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

In addition, each of the components (e.g., modules or programs) according to various embodiments may include a single entity or a plurality of entities, and some sub-components of the sub-components described above may be omitted, or other sub-components may be further included in the various embodiments. Alternatively or additionally, some components (e.g., modules or programs) may be integrated into one entity to perform the same or similar functions performed by the respective components prior to the integration.

The operations performed by the module, the program, or other component, in accordance with various embodiments may be performed in a sequential, parallel, iterative, or heuristic manner, or at least some operations may be executed in a different order or omitted, or other operations may be added.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

The various embodiments described above may be implemented as software including instructions stored in a machine-readable storage media which is readable by a machine (e.g., a computer). The device may include the electronic device (e.g., electronic device 100) according to the disclosed embodiments, as a device which calls the stored instructions from the storage media and which is operable according to the called instructions.

When the instructions are executed by a processor, the processor may directory perform functions corresponding to the instructions using other components or the functions may be performed under a control of the processor. The instructions may include code generated or executed by a compiler or an interpreter.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. An electronic device comprising:
a communication interface;
a memory configured to store text information received from a first external device; and
a processor configured to:
receive first text information from the first external device via the communication interface, wherein the first text information is not a completed sentence, based on second text information previously received from the first external device being identified among the text information stored in the memory, obtain third text information by combining the first text information with the second text information, wherein the second text information is not the completed sentence, identify whether the third text information is the completed sentence by performing natural language understanding using the third text information, based on identifying that the third text information is the completed sentence, control the communication interface to transmit the third text information to the first external device and a second external device, obtain at least one response to a user query included in the third text information and information regarding a plurality of elements related to a selection of a user for the at least one response based on the third text information, and control the communication interface to transmit the at least one response and the information regarding the plurality of elements to the first external device, wherein the processor is further configured to:
based on the first text information being received from the first external device via the communication interface, control the communication interface to transmit the first text information to the second external device, and based on fourth text information being received from the second external device via the communication interface, control the communication interface to transmit the fourth text information to the first external device.

2. The electronic device of claim 1, wherein the processor is further configured to:
based on the third text information being obtained, update the first text information to the third text information and store the third text information in the memory, and
based on identifying that the third text information is the completed sentence, remove the third text information from the memory after the at least one response is transmitted to the first external device.

3. The electronic device of claim 1, wherein the processor is further configured to, based on identifying that the third text information is not the completed sentence, maintain the third text information in the memory until additional text information is received from the first external device or a preset time elapses.

4. The electronic device of claim 1, wherein the processor is further configured to:
receive, from the first external device via the communication interface, typing status information indicating whether the user is inputting text information via the first external device, and
identify whether the third text information is the completed sentence based on performing the natural language understanding and the typing status information.

5. The electronic device of claim 4, wherein the processor is further configured to identify whether the third text information is the completed sentence based on performing the natural language understanding, the typing status information, and timer information related to a time which elapses from a reception time of the first text information.

6. The electronic device of claim 5, wherein the processor is further configured to:
obtain a comprehensive score by assigning weights for each of a first score related to the natural language understanding, a second score related to the typing status information, and a third score related to the timer information, and
based on the comprehensive score being greater than or equal to a preset threshold value, identify that the third text information is the completed sentence.

7. The electronic device of claim 6, wherein the processor is further configured to:
generate a database to personalize the weights and the preset threshold value based on at least one of information related to a typing speed of the user and information related to a typing habit of the user, and
store the database in the memory.

8. A control method of an electronic device, the control method comprising:
receiving first text information from an first external device, wherein the first text information is not a completed sentence;
based on second text information previously received from the first external device being identified among text information stored in a memory of the electronic device, obtaining third text information by combining the first text information with the second text information, wherein the second text information is not the completed sentence;
identifying whether the third text information is the completed sentence by performing natural language understanding using the third text information;
based on identifying that the third text information is the completed sentence, transmitting the third text information to the first external device and a second external device;
obtaining at least one response to a user query included in the third text information and information regarding a plurality of elements related to a selection of a user for the at least one response based on the third text information; and
transmitting the at least one response and the information regarding the plurality of elements to the first external device,
wherein the control method further comprises:
based on the first text information being received from the first external device via a communication interface, transmitting the first text information to the second external device; and
based on fourth text information being received from the second external device via the communication interface, transmitting the fourth text information to the first external device.

9. The control method of claim 8, further comprising:
based on the third text information being obtained, updating the first text information to the third text information and storing the third text information in the memory; and
based on identifying that the third text information is the completed sentence, removing the third text information from the memory after the at least one response is transmitted to the first external device.

10. The control method of claim 8, further comprising:
based on identifying that the third text information is not the completed sentence, maintaining the third text information in the memory until additional text information is received from the first external device or a preset time elapses.

11. The control method of claim 8, wherein the identifying whether the third text information is the completed sentence further comprises:

receiving, from the first external device, typing status information indicating whether the user is inputting text information via the first external device; and identifying whether the third text information is the completed sentence based on performing the natural language understanding and the typing status information.

12. The control method of claim 11, wherein the identifying whether the third text information is the completed sentence further comprises:

identifying whether the third text information is the completed sentence based on performing the natural language understanding, the typing status information, and timer information related to a time which elapses from a reception time of the first text information.

13. A non-transitory computer readable recording medium comprising a program to execute a controlling method of an electronic device, wherein the controlling method of the electronic device comprises:

receiving first text information from an first external device, wherein the first text information is not a completed sentence;

based on second text information previously received from the first external device being identified among text information stored in a memory of the electronic device, obtaining third text information by combining the first text information with the second text information, wherein the second text information is not the completed sentence;

identifying whether the third text information is the completed sentence by performing natural language understanding using the third text information;

based on identifying that the third text information is the completed sentence, transmitting the third text information to the first external device and a second external device;

obtaining at least one response to a user query included in the third text information and information regarding a plurality of elements related to a selection of a user for the at least one response based on the third text information; and transmitting the at least one response and the information regarding the plurality of elements to the first external device, wherein the control method further comprises:
based on the first text information being received from the first external device via a communication interface, transmitting the first text information to the second external device; and
based on fourth text information being received from the second external device via the communication interface, transmitting the fourth text information to the first external device.

14. A control method of an electronic device, the control method comprising:

receiving first text information from an first external device, wherein the first text information is not a completed sentence;

receiving second text information from the first external device based on receiving the first text information, wherein the second text information is not the completed sentence;

obtaining third text information by combining the first text information and the second text information;

performing natural language understanding using the third text information;

obtaining typing status information that indicates whether a user of the first external device is inputting text information via the first external device;

obtaining timing information that indicates an elapsed time from receiving the first text information;

identifying that the third text information is the completed sentence based on performing the natural language understanding, the typing status information, and the timing information;

based on identifying that the third text information is the completed sentence, transmitting the third text information to the first external device and a second external device;

obtaining at least one response to a user query included in the third text information and information regarding a plurality of elements related to a selection of the user for the at least one response based on the third text information; and providing the at least one response and the information regarding the plurality of elements to the user query to the first external device, wherein the control method further comprises:
based on the first text information being received from the first external device via a communication interface, transmitting the first text information to the second external device; and
based on fourth text information being received from the second external device via the communication interface, transmitting the fourth text information to the first external device.

15. The control method of claim 14, further comprising:
identifying, based on performing the natural language understanding, a grammatical element included in the third text information; identifying a meaning of the third text information based on the grammatical element; and
identifying that the third text information is the completed sentence based on identifying the meaning of the third text information.

16. The control method of claim 14, further comprising:
identifying, based on the timing information, that the elapsed time is greater than or equal to a predetermined threshold value; and
identifying that the third text information is the completed sentence based on identifying that the elapsed time is greater than or equal to the predetermined threshold value.

17. The control method of claim 14, further comprising:
identifying, based on the typing status information, that the user is not inputting additional text information via the first external device; and
identifying that the third text information is the completed sentence based on identifying that the user is not inputting the additional text information via the first external device.

18. The control method of claim 14, further comprising:
assigning a first score for a result of performing the natural language understanding, a second score for the timing information, and a third score for the typing status information;
obtaining a total score based on the first score, the second score, and the third score; and
identifying that the third text information is the completed sentence based on the total score being greater than or equal to a predetermined threshold value.

* * * * *